Oct. 28, 1947.  I. R. VERSOY  2,429,782

DETACHABLE CONNECTION

Filed April 28, 1944

Inventor

Irving R. Versoy

By Rockwell & Bartholow

Attorneys

Patented Oct. 28, 1947

2,429,782

UNITED STATES PATENT OFFICE 2,429,782

DETACHABLE CONNECTION

Irving R. Versoy, New Haven, Conn., assignor to The Berger Brothers Company, New Haven, Conn., a corporation of Connecticut Application April 28, 1944, Serial No. 533,179

1 Claim. (Cl. 285—163)

This invention relates to detachable connectors, and more especially to a connector or coupling between two air ducts or like members where it is desired to make an airtight connection and at the same time one which is readily detachable upon the exertion of a relatively small effort.

While not limited to any particular application, the invention is particularly adapted to a coupling for use in the air line between a source of compressed air and an aviator's anti-blackout suit. In order to overcome the effect upon an airplane pilot of centrifugal force due to maneuvering of a plane, which force often tends to cause the blood to leave the head and trunk of the body and produce temporary unconsciousness and also causes dislocation of the body organs, protective devices have been provided which serve to prevent or minimize such effects. These protective devices include inflatable bladders or the like which may be placed in communication with a source of fluid pressure so that they can be inflated at the proper time. The source of pressure is usually carried on the plane itself and connected to the inflatable bladders carried on the body of the pilot by a suitable air duct or tube. It is desirable to have in this air line a readily detachable connection which may be easily separated by a relatively light pull but which at the same time will be fluid tight so that no leakage of the compressed air is permitted.

One of the objects of the present invention is to provide a new and improved airtight detachable connection.

A further object of the invention is to provide a detachable connection between two air ducts, the parts of which may be disconnected by a relatively light pull but which at the same time ordinarily will be held in connected relation, making a fluid-tight joint.

A still further object of the invention is to provide a detachable connection comprising male and female members of metal or other rigid material, the female member having a bushing therein of rubber or other compressible material to make tight contact with the male member, and means within the female member in addition to said bushing for detachably securing the parts together.

Still another object of the invention is to provide a detachable connection consisting of male and female members, the former of which is designed to enter within the latter and to provide means within the female member for making an air-tight connection between the two members, and additional means also disposed within the female member for securing the two members detachably together.

To these and other ends, the invention relates to the novel features and combinations of parts to be hereinafter described and claimed.

Figure 1:
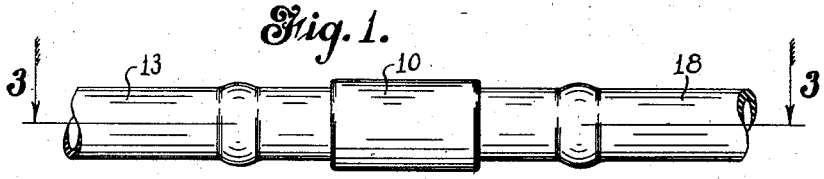
Fig. 1 is a side elevational view of a detachable coupling embodying my invention.
Figure 2:
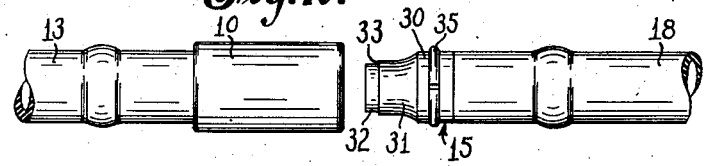
Fig. 2 is a view similar to Fig. 1 but showing the two parts of the coupling in detached relation.
Figure 3:
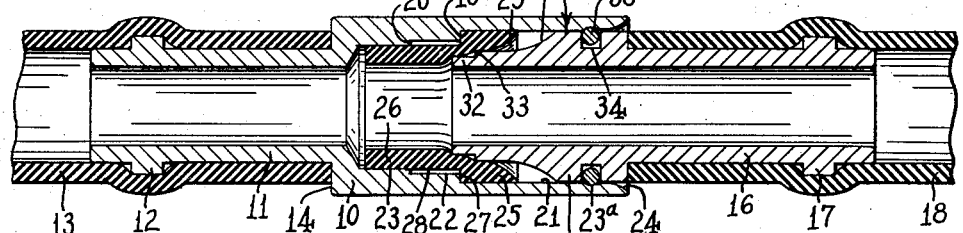
Fig. 3 is a sectional view on line 3—3 of Fig. 1.

To illustrate a preferred embodiment of my invention, I have shown a detachable connector or coupling, comprising a female member consisting of a sleeve portion 10 having a hollow neck 11 thereon, which neck may be provided with an annular rib or bead 12 over which may be slipped the end 13 of a rubber tube or other fluid-carrying duct, the end of the tube abutting the shoulder 14 between the sleeve 10 and the neck 11. The rib 12, by serving to expand the tube 13, will hold the latter in place, as will be readily understood.

The other portion of the coupling comprises a male member consisting of a nipple 15 having secured thereto a neck 16 provided with a rib 17 to cooperate with a rubber tube or other fluid-carrying duct 18, so as to make an airtight connection between the nipple and the duct.

The female member or sleeve 10 is provided with internal outwardly facing annular shoulders 19 and 20, thus having three portions 21, 22 and 23 of different internal diameters, the shoulder 19 being wider than the shoulder 20. The internal diameter of the portion 23 is somewhat larger than that of the neck 11 so as to permit the insertion, in the female member, of a bushing, as will be hereinafter described, without restricting the size of the passageway below that of the neck. The sleeve portion 10 is also provided with a shallow recess 23ª, adjacent its outer or open end, and outwardly of this recess the inner wall is beveled outwardly as at 24 to provide a flaring mouth.

Within the female portion of the coupling is mounted a bushing of rubber or compressible material. This bushing comprises an outer base portion 25 fitting against the wall 21, and an inner skirt portion 26 of smaller diameter than the portion 25, thus providing an annular shoulder 27 between these parts. It will be noted that, when the bushing is in place, as shown for example in Fig. 4, the shoulder 27 is lodged against the shoulder 19, and the base or outer portion 25 of the bushing fits tightly against the wall 21 of the sleeve 10 to make an airtight joint and to limit the insertion of the bushing in the sleeve.

The skirt portion of the bushing 26 is of substantially the same outside diameter as the inside diameter of the portion 23 of the sleeve, thus leaving a small space 28 between the outer face of the bushing and the inner face of the portion 22 of the sleeve. It will also be noted that, adjacent its outer end, the inner wall of the bushing is tapered or flared, as shown at 29, so as to provide a tapered opening to receive the male member or nipple, as will be hereinafter described.

The nipple or male portion of the coupling comprises a base part 30 from which extends inwardly a tapered portion 31 and an inner reduced portion 32, the portions 31 and 32 being separated by a relatively narrow shoulder 33. An outwardly facing annular recess 34 is provided in the side wall of the base 30, within which is mounted a split ring 35, the ring having a tendency to expand and being normally of slightly larger external diameter than that of the part 30 of the nipple.

Figure 4:
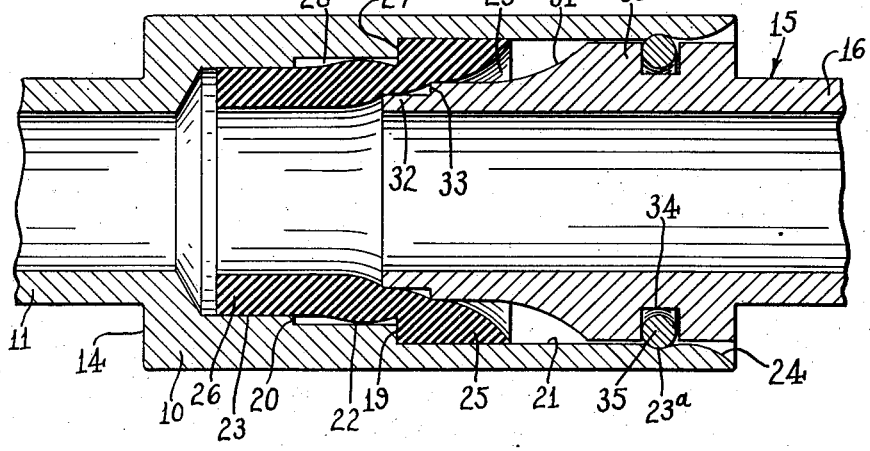
Fig. 4 is an enlarged sectional view through the central portion of the coupling.

As will be seen from Fig. 4, when the male member or nipple is inserted into the female member or sleeve, the split ring will be cammed into the recess 34 by the flaring wall 24 of the sleeve. When, however, the ring reaches a point opposite the shallow recess 23ª, it will spring outwardly into this recess and not only tend to prevent a further insertion of the nipple into the sleeve but will tend to hold the parts detachably together. It may also be noted that this detachable connecting means, when the parts are assembled, lies wholly within the sleeve so that these parts are not exposed, either to detract from the appearance of the coupling or to catch on the clothing of the user.

As will also be seen from Fig. 4, the inner end of the nipple enters the tapered portion 29 of the bushing, compressing the latter and making an airtight connection therewith, the nipple impinging against the bushing, particularly at the points opposite the shoulder 33 and at the extreme end portion of the part 32. At the latter point, due to the fact that the end of the nipple is slightly larger than the internal diameter of the bushing, the wall of the latter will be bulged or displaced outwardly toward the wall of the portion 22 of the sleeve.

It will be obvious that with this construction the bushing will make airtight contact with the sleeve and the nipple or male member will make airtight contact with the bushing, so that there will be no leakage of air from the coupling, the air delivered from the tube 18, which will usually be attached to the source of compressed air, passing through the bushing and neck 11 into the tube 13 which will ordinarily be attached to the suit of the pilot.

It will also be noted that the engagement of the spring ring 35 in the recess 23ª will hold the two parts of the coupling in connected relation but will permit separation of the parts when subjected to a relatively light pull. Also, the engagement of the nipple within the tapered portion of the bushing will normally offer frictional resistance to the detachment of the parts. This latter resistance may be largely overcome, however, by provision of the space 28 between the bushing and the wall 22 of the sleeve. This is due to the fact that when pressure is built up in the inflatable bladder or other vessel to which the tube 13 is connected, there will be a back flow of air between the skirt of the bushing and the wall 23 of the sleeve, this air entering the space 28 and tending to force the skirt 26 of the bushing inwardly over the end of the portion 32 of the nipple. This not only assists in perfecting the seal between the bushing and the nipple but also tends to force the nipple outwardly so as to overcome the friction between the nipple and the bushing.

By the construction shown and by the provision of the shoulder 33 on the nipple and a short reduced portion 32 above this shoulder, I secure a good air seal while, at the same time, reducing the frictional contact between the bushing and the nipple so that there will be little opposition to the separation of the two parts of the coupling. This is desirable if the device is used in connection with a pilot's anti-blackout suit, for example, as, if it is necessary for the pilot to bail out of his plane, the parts of the coupling should be readily detachable and be separated by a relatively light pull. If, however, the coupling is used in other apparatus where higher air pressure is employed and therefore a more effective seal desired, the portion 32 may be made longer, thus increasing the contact between this part of the nipple and the bushing, and thus perhaps providing a more effective seal when higher pressures are employed, while at the same time sacrificing, to some extent, the ease of detachability of the parts.

While I have shown and described a preferred embodiment of my invention, it will be understood that it is not to be limited to all of the details shown but is capable of modification and variation within the spirit of the invention and within the scope of the claim.

What I claim is:

A detachable coupling comprising a sleeve of rigid material, a compressible bushing within the sleeve, a rigid nipple insertable into the sleeve to extend into the bushing and make tight contact therewith, said bushing having an inner skirt portion normally spaced from the wall of the sleeve, and the end of said nipple expanding said skirt portion toward the wall of the sleeve whereby pressure between the sleeve wall and the skirt tends to force the nipple outward, and means beyond the bushing for detachably connecting the nipple to the sleeve, said means comprising a split ring carried by one of said members, and the other of said members having a recess with which said ring engages.

IRVING R. VERSOY.

REFERENCES CITED

The following references are of record in the file of this patent:

UNITED STATES PATENTS

| Number | Name | Date |
| --- | --- | --- |
| 858,131 | Aichele | June 25, 1907 |
| 1,107,327 | Lewis | Aug. 18, 1914 |
| 1,360,829 | Tunnell | Nov. 30, 1920 |
| 1,386,518 | Loomis | Aug. 2, 1921 |
| 1,890,011 | Wirz | Dec. 6, 1932 |